United States Patent [19]

Lambrecht

[11] Patent Number: 6,115,242
[45] Date of Patent: *Sep. 5, 2000

[54] CHIP CHASSIS INCLUDING A MICRO-BACKPLANE FOR RECEIVING AND CONNECTING A PLURALITY OF COMPUTER CHIPS

[75] Inventor: J. Andrew Lambrecht, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/957,283

[22] Filed: Oct. 24, 1997

[51] Int. Cl.[7] .............................. G06F 1/16; H05K 9/00; H02B 1/02
[52] U.S. Cl. ................... 361/684; 361/727; 361/799; 361/802; 439/377; 439/64; 257/686
[58] Field of Search .................. 361/686, 684, 361/730, 733, 735, 212, 220, 799, 802, 756, 741, 796, 729, 728, 439, 395; 257/685, 686; 483/109; 439/64, 377, 92, 8, 62, 65, 267, 61

[56] References Cited

U.S. PATENT DOCUMENTS

| | | | |
|---|---|---|---|
| 3,218,518 | 11/1965 | Ashbridge et al. | 361/730 |
| 3,576,515 | 4/1971 | Frantz | 439/267 |
| 4,017,770 | 4/1977 | Valfre | 361/756 |
| 4,158,220 | 6/1979 | Yamamoto et al. | 361/796 |
| 4,247,882 | 1/1981 | Prager et al. | 361/686 |
| 4,334,261 | 6/1982 | Gonzales | 361/686 |
| 4,918,335 | 4/1990 | Chall, Jr. | 361/730 |
| 5,067,040 | 11/1991 | Fallik | 361/686 |
| 5,067,041 | 11/1991 | Cooke et al. | 361/730 |
| 5,278,730 | 1/1994 | Kikinis | 361/686 |
| 5,289,363 | 2/1994 | Ferchau et al. | 361/730 |
| 5,336,099 | 8/1994 | Alous et al. | 361/686 |
| 5,373,149 | 12/1994 | Rasmussen | 361/686 |
| 5,398,159 | 3/1995 | Andersson et al. | 361/735 |
| 5,406,450 | 4/1995 | Shieh | 361/686 |
| 5,774,338 | 6/1998 | Wessling, III | 361/730 |
| 5,801,921 | 9/1998 | Miller | 361/686 |
| 5,818,696 | 10/1998 | Knoop | 361/730 |

*Primary Examiner*—Leo P. Picard
*Assistant Examiner*—Lisa Lea-Edmonds
*Attorney, Agent, or Firm*—Conley, Rose & Tayon P.C.

[57] ABSTRACT

A chip chassis comprises a housing for enclosing a plurality of semiconductor devices having electrical contacts. The housing is configured to include a plurality of slots each adapted for receiving a semiconductor device. The housing further comprises a plurality of connectors in each of the slots. Each connector within a respective slot of the housing is adapted to electrically contact corresponding electrical contacts of the semiconductor device when the semiconductor device is inserted within the respective slot. Each of the plurality of connectors in each of the slots is electrically coupled to provide an electrical backplane within the housing for electrical communications between each of the slots. The housing may be configured to couple thermally with a heat sink and provide access for a flow-through of a forced coolant. The slots may be adapted to receive a particular type of semiconductor device. Moreover, the connectors comprised in a particular slot may be configured for electrically contacting corresponding electrical contacts on the particular type of semiconductor device designed for the corresponding slot when that particular type of semiconductor device is inserted within the slot. The particular types of semiconductor devices which may be housed in the chip chassis include processors, memories, or I/O control modules. Some slots may be configured for the semiconductor devices to access external data storage devices for the storage and retrieval of data. The chip chassis may also include one or more of the semiconductor devices configured to be housed in the slots of the housing.

36 Claims, 5 Drawing Sheets

CHIP CHASSIS INCLUDING A MICRO-BACKPLANE FOR RECEIVING AND CONNECTING A PLURALITY OF COMPUTER CHIPS

BACKGROUND OF THE INVENTION

1. Field of the Invention

The present invention is related to semiconductor integrated circuits, and more particularly to a chip chassis system for housing a plurality of modules interconnected by a micro-backplane for ease of integration and interchangability.

2. Description of the Related Art

Computer systems have traditionally comprised a system unit or housing which encloses a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions.

Computer systems of different kinds are currently being used in many applications which require portability and/or reduced size, such as laptops, palmtops, PDAs (portable digital assistants) etc., as well as a number of new consumer electronic devices. Modularity of components is also desirable for its lower cost of manufacture and faster speed in replacing of broken parts. Therefore, an improved system is desired for integrating a plurality of integrated circuits in an easily interchangeable fashion.

SUMMARY OF THE INVENTION

The present invention comprises chip chassis for housing a plurality of semiconductor devices having electrical contacts. The chip chassis comprises a housing configured to include a plurality of slots, each adapted for receiving a semiconductor device. The housing further comprises a plurality of connectors in each of the slots. Each connector within a respective slot of the housing is adapted to electrically contact corresponding electrical contacts of the semiconductor device when the semiconductor device is inserted within the respective slot. Each of the plurality of connectors in each of the slots is electrically coupled to provide an electrical backplane within the housing for electrical communications between each of the slots. The housing may be configured to couple thermally with a heat sink and may be further configured to provide access for flow-through of a forced coolant.

In one embodiment, each of the plurality of slots is adapted to receive a particular type of semiconductor device. Moreover, the plurality of connectors comprised a particular slot are configured for electrically contacting corresponding electrical contacts on the particular type of semiconductor device designed for the corresponding slot when the particular type of semiconductor device is inserted within the corresponding slot of the housing. The particular types of semiconductor devices which may be housed in the chip chassis include processing units, memory modules, or I/O control modules. The plurality of connectors comprised in a particular slot are configured for electrically contacting corresponding electrical connectors on the respective semiconductor device or module. Some I/O slots may be configured to provide access for the semiconductor devices to external data storage devices for the storage and retrieval of data.

In another embodiment, each of the pluralities of connectors comprised in each of the slots includes an internal bus connector. The internal bus connector is electrically coupled to provide command pathways and data pathways among only the semiconductor devices placed within the housing. The housing thus configured includes signal traces which provide electrical connections only between the internal bus connectors. For communications external to the chip chassis, one of the connectors comprised in at least one of the slots may be electrically coupled to provide command pathways and data pathways only between the semiconductor devices and a device external to the housing.

In still another embodiment, the chip chassis for housing a plurality of semiconductor devices comprises a housing as well as one or more of the semiconductor devices configured to be housed in the slots of the housing.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises a chip chassis or docking station system for housing a plurality of modules and including a micro-backplane providing electrical connectivity between the modules, wherein the chip chassis provides for ease of integration and interchangability.

Figure 1:
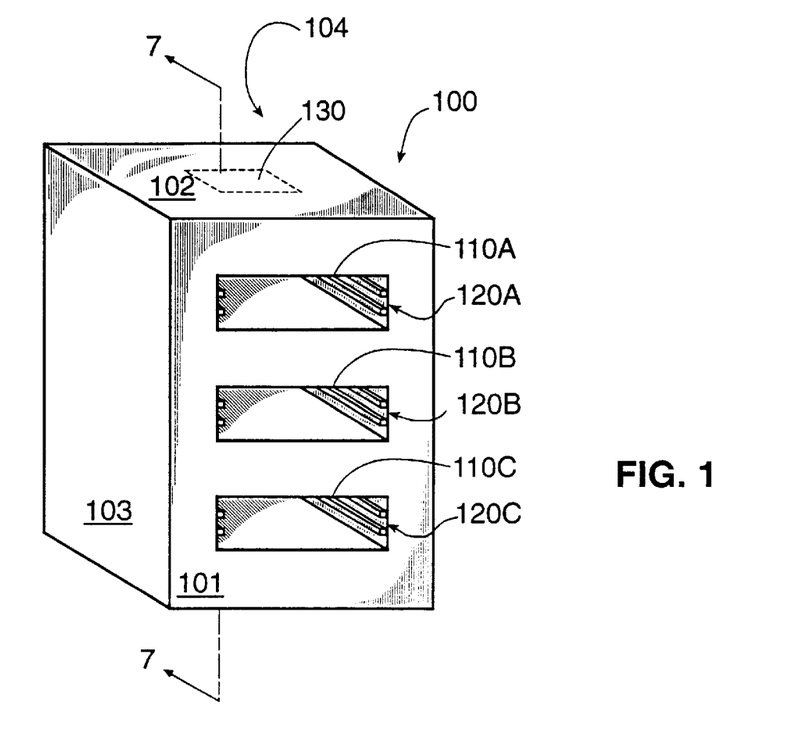
FIG. 1 illustrates a chip chassis for housing and interconnecting semiconductor devices according to the present invention.

FIG. 1—Chip Chassis

Referring now to FIG. 1, a chip chassis or housing 100 is shown from a front prospective view. The housing 100 includes a front 101, a top 102, a right side 103, and a back 104. Slots 110A–110C house railings with connectors 120A–120C for coupling to and housing semiconductor devices or modules 200, see FIG. 2A for further details. Location 130 on top 102 is preferably operable to accept a heat sink or cooling fin array (not shown).

Figure 2A:
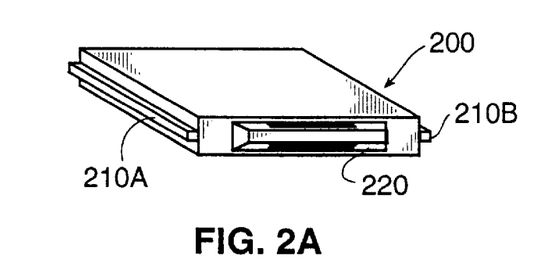
FIG. 2A illustrates an embodiment of a semiconductor device which could be inserted into the chip chassis shown in FIG. 1 according to the present invention.
Figure 2B:
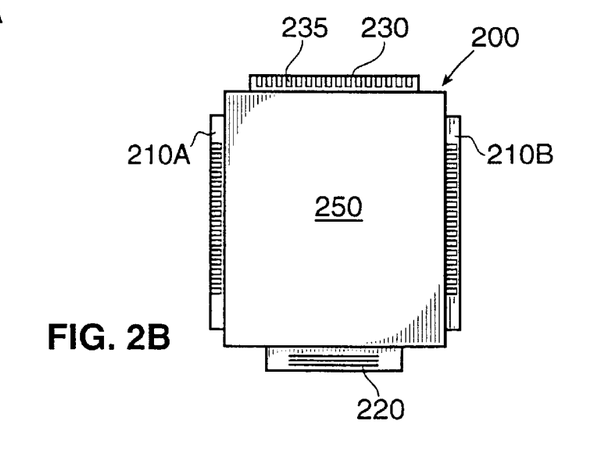
FIG. 2B illustrates a top view of the embodiment of a semiconductor device shown in FIG. 2A.

The chip chassis or housing 100 is operable to house a plurality of semiconductor devices 200 having electrical contacts 235, see FIG. 2B for more details. The housing is configured to include or define a plurality of slots 110. Each of the slots 110 is adapted for receiving a semiconductor device 200. The housing 100 further comprises a plurality of connectors on railings 120 comprised in each of the slots 110. The connectors on the railings 120 within a respective slot 110 of the housing 100 are adapted to electrically contact corresponding electrical contacts 235 on tabs 210A, 210B and/or 230 of the semiconductor device 200 when the semiconductor device 200 is inserted within the Each of the plurality of connectors 710, see FIG. 7 for more details, such as those on railings 120, comprised in each of the slots 110 is electrically coupled to provide an electrical backplane 730 within the housing 100 for electrical communications between each of the slots 110. That signals may be routed between the connectors on railings 120 and the plurality of These sideplane routings may be through traces placed on the chassis walls, such as makes up side 103 sink, such as at location 130 on top 102 and location 830 on back 104, see FIG. 8 for more details. The housing may be further configured to provide access for a flowthrough of a forced coolant. This will be discussed further in relation to FIG. 9.

Chip chassis 100 utilizes a generic method for interconnecting multiple semiconductor devices 200 in a generic micro-backplane housing 100 using intelligent buffering and a universal slot 110 design. Each semiconductor device 200 is provided access to a communications pathway which allows for heterogeneous and homogeneous module 200 types to form a networked system in a single integrated micro-backplane. The present invention allows "system on a chip" producers to integrate system designs from different sources or core vendors. This promotes integration of "best of breed" computer chips from an evolving industry of "virtual component" suppliers. Further details of the chip chassis 100 and semiconductor devices 200 which are placed in the chip chassis 100 will be given in the descriptions of FIGS. 2–9.

FIGS. 2A/2B—Semiconductor Devices or Modules

Referring now to FIGS. 2A and 2B, an embodiment is shown of an embodiment of a semiconductor device or module 200 which could be inserted into the chip chassis 100 shown in FIG. 1 according to the present invention. A module 200 is a semiconductor device 200, possibly enclosed in packaging such as is well known in the art, which is adapted to be inserted into the chip chassis 100. FIG. 2A illustrates the module from a front perspective view while FIG. 2B illustrates a top view.

Each semiconductor device 200 includes a right tab 210A with electrical contacts 235, a left tab 210B with electrical contacts 235, and a rear tab 230 with electrical contacts 235. Semiconductor device 200 also includes a handle 220 for aiding in the insertion of the module 200 into the housing 100. The communications carried by the electrical contacts 235 when in electrical connection with the connectors on the railings 120 or the plurality of connectors 710 may include data, control signals, I/O (input/output) signals, power signals or other signals as desired. For example, the power signals and power-on signals are preferably provided by couplings through the electrical power to ground is preferably interspersed on all side on the tabs 210A, 210B, 230.

Preferably, at least one of the semiconductor devices 200 is a processing unit, and the plurality of connectors on the railings 120 and/or the plurality of connectors 710 comprised in at least one of the plurality of slots are configured for electrically contacting corresponding electrical connectors on the processing unit. Likewise, at least one of the semiconductor devices 200 is a memory module with a slot 110 configured for coupling to a memory module. In many cases, at least one of the semiconductor devices 200 is preferably an I/O control module for controlling accesses across the inside/outside boundary of the housing 100. In other words, the I/O control module is configured to provide access for the semiconductor devices to external data storage devices for the storage and retrieval of data.

One or more of the semiconductor devices 200 may be a system module including multiple functions within a single module. The system module may include any two or more processors, memories, or I/O controllers, or combinations thereof. It is contemplated that more than one system module could be inserted and operable in a single chip chassis 100 at the same time. The plurality of system modules could concurrently communication with each other as well as with devices external to the chip chassis 100.

Figure 3:
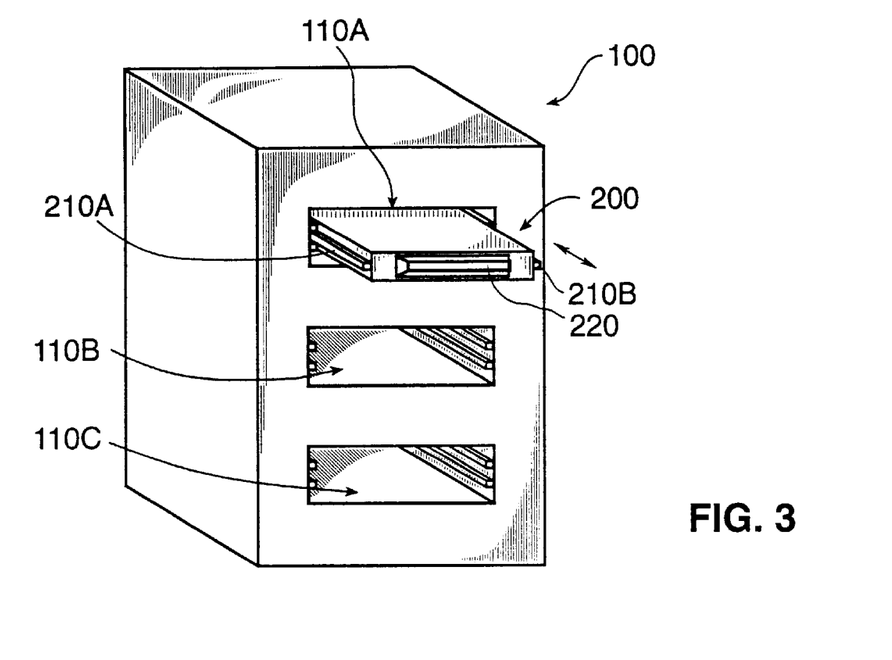
FIG. 3 illustrates a semiconductor devices as shown in FIGS. 2A and 2B being inserted into a chip chassis as shown in FIG. 1.

FIG. 3—Inserting a Module into the Housing

Referring now to FIG. 3, an embodiment is shown of a module 200 of FIGS. 2A and 2B being inserted into the housing 100. By way of example, a module 200 is inserted into slot 110A using the handle 220. The tabs 210A and 210B are preferably placed in the groove of railings 120A and 120B such that the module slides smoothly into the slot 110A as a gentle force is applied to handle 220 until tab 230 electrically adjoins connector 710A at the back of the slot 110A. The module 200 remains in place in its respective slot 110A by means of a friction fit or other attachment as desired. A module 200 may be removed from the housing in the reverse manner by applying a pulling force to the handle 220 until the electrical coupling and adjoinment is broken. At that time, the module 200 may be smoothly withdrawn from the slot 210A.

Figure 4:
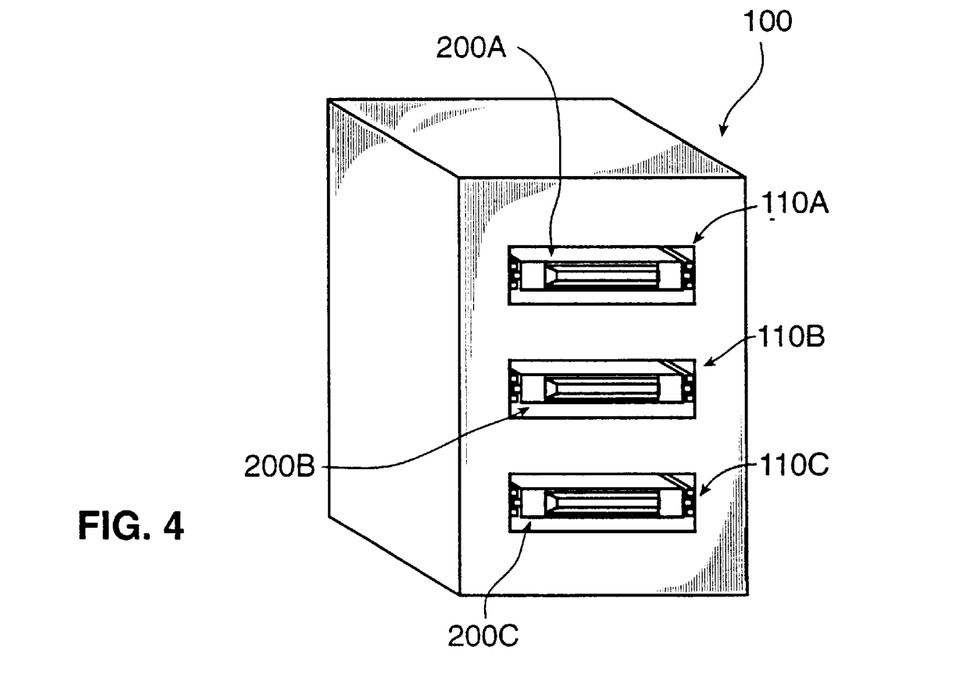
FIG. 4 illustrates into a chip chassis as shown in FIG. 1 housing three of the semiconductor devices shown in FIG. 2A according to the present invention.

FIG. 4—Housing with installed Modules

Referring now to FIG. 4, a housing 100 is illustrated with modules 200A–200C properly and fully inserted into slots 110A–110C, respectively. Preferably, at least one of the semiconductor devices 200A–200C is a processing unit in a slot 110 configured for electrically contacting the corresponding electrical connectors 235 on tabs 210A, 210B and 230 on the processing unit. Also, at least one of the semiconductor devices 200A–200C is preferably a memory module 200, and at least one is an I/O control module 200. In other embodiments with other numbers of slots 110, there may be multiple processor modules 200, multiple memory modules 200, and/or multiple I/O control modules 200. A semiconductor device 200 or module 200 may also be a hybrid semiconductor device 200 comprising multiple modules which are processors, memories and/or I/O devices such as is disclosed in the co-pending patent application, Ser. No. 08/892,415 (Atty. Dkt No. 500-95900), titled "Flexible Buffering Scheme for Inter-Module On-Chip Communications," filed on Jul. 14, 1997, whose inventor is Alfred C. Hartmann or the co-pending patent application with Ser. No. 08/957,591, (Atty. Dkt. No. 5000-97500), titled "On-Chip Hybridization of Memory Types for Flexible Organization in a System on a Chip," filed on Oct. 24, 1997 whose inventor is Alfred C. Hartmann, which are both hereby incorporated by reference.

Figure 5A:
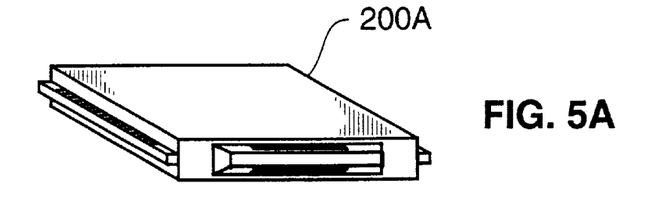
FIGS. 5A, 5B and 5C illustrate additional embodiments of semiconductor devices which could be inserted into the chip chassis shown in FIG. 1 according to the present invention, where the physical dimensions of the semiconductor devices differentiate different tasks performed by the semiconductor devices.
Figure 5B:
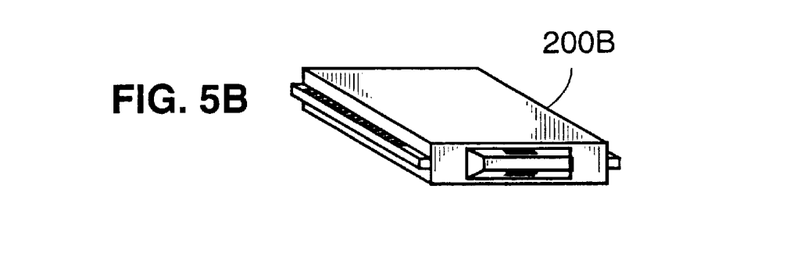
Figure 5C:
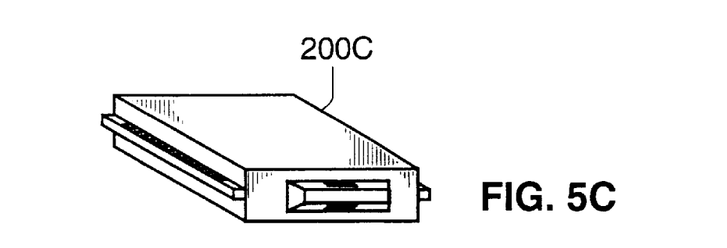

FIGS. 5A/5B/5C—Modules with Size Correlated to Function

Referring now to FIGS. 5A/5B/5C, embodiments of the semiconductor devices 200 are illustrated where the function of each module 200 is correlated with the physical dimensions of that module 200. For example, module 200A shown in FIG. 5A is preferably a processor module 200 or a hybrid module 200 with a majority of the modules comprised therein being processors. Likewise, modules 200B and 200C are preferably a memory module 200 and an I/O module 200, respectively. As with the processor module 200A, modules 200B and 200C may be hybrids with a majority of the modules comprised therein being of the type correlated with the size and shape of that module 200 type.

Figure 6:
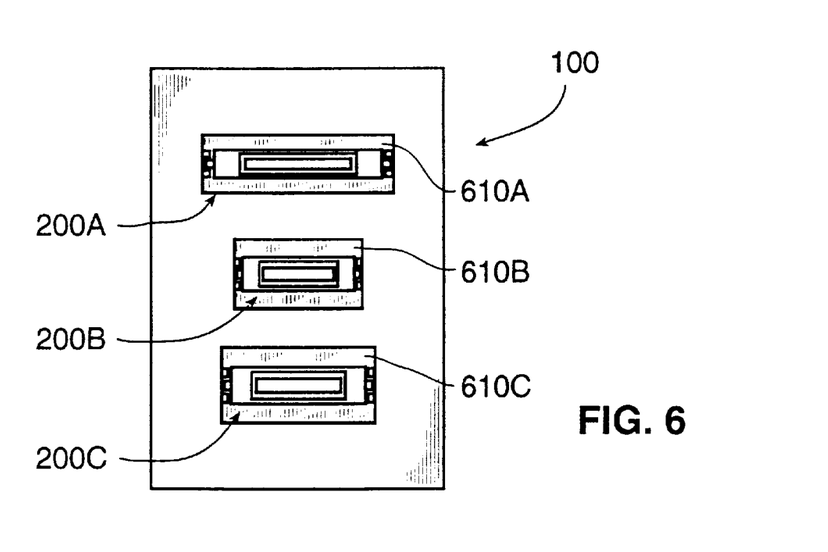
FIG. 6 illustrates into a chip chassis similar to the one shown in FIG. 1 housing the three semiconductor devices shown in FIGS. 5A, 5B and 5C according to the present invention.

FIG. 6—Housing with Size-Function Correlated Modules Installed in Cooling Slots

Referring now to FIG. 6, a housing 100 is illustrated with modules 200A–200C properly and fully inserted into slots 610A–610C, respectively. Slots 610 differ from slots 110 previously illustrated in two ways. First, additional room above and below the modules 200 is available for the passage of a cooling fluid, either by natural convection or by forced convection. Second, in this embodiment, the slots of housing 100 are configured to receive only certain types of modules 200. One advantage of having different types of semiconductor devices, or modules, 200 with different sizes is that the user is prevented from inserting a particular module 200 into an incorrect slot 610.

The semiconductor devices 200A–200C illustrated are those shown in FIGS. 5A/5B/5C where the function or primary function of the module 200 correlates with the physical dimensions of the module 200. Semiconductor device 200A is a processing unit in a slot 610 configured for electrically contacting the corresponding electrical connectors 235 on tabs 210A, 210B and 230 on the processing unit. Also, at least one of the semiconductor devices 200B–200C is preferably a memory module 200, and the other is an I/O control module 200. Other combinations of modules 200 with various functions are contemplated.

Figure 7:
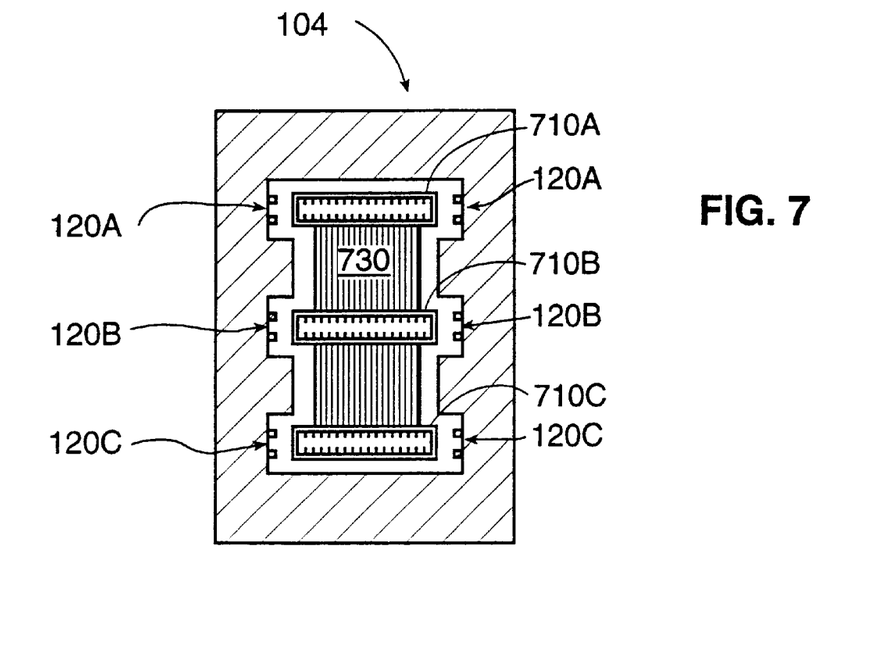
FIG. 7 illustrates an internal backplane of a chip chassis as shown in FIG. 1 showing the signal traces by which semiconductor devices inserted into the chip chassis communicate according to the present invention.

FIG. 7—Micro-Backplane of Housing

Referring now to FIG. 7, an embodiment of the internal micro-backplane in the rear of the slots 110 or slots 610 of housing 100 is illustrated. The railings 120A–120C on either side of the housing 100 are operable to guide the modules 200 as they are inserted into the housing 100 until the tab 230 makes contact and enjoins the connectors/internal bus connectors 710 coupled to the signal traces 730 on the backplane. Each of the pluralities of connectors on the railings 120 comprised in each of the slots 110 or 610 includes an internal bus connector 710 electrically coupled to provide command pathways and data pathways among only the semiconductor devices 200 placed within the housing 100. The housing 100 further includes signal traces 730 which provide electrical connections between the connectors/internal bus connectors 710. In one embodiment, one of the connectors 710 and/or one of the connectors on the railings 120 comprised in one of the slots 110 or 610 is electrically coupled to provide command pathways and data pathways only between the semiconductor devices 200 and a device (not shown, but refer to FIG. 8) external to the housing 100. The electrical backplane 730 may include traces on the inner surfaces of the side walls (e.g. the side wall that makes up side 103), of the chassis 100, as well as the inside of the wall on the back side 104.

Figure 8:
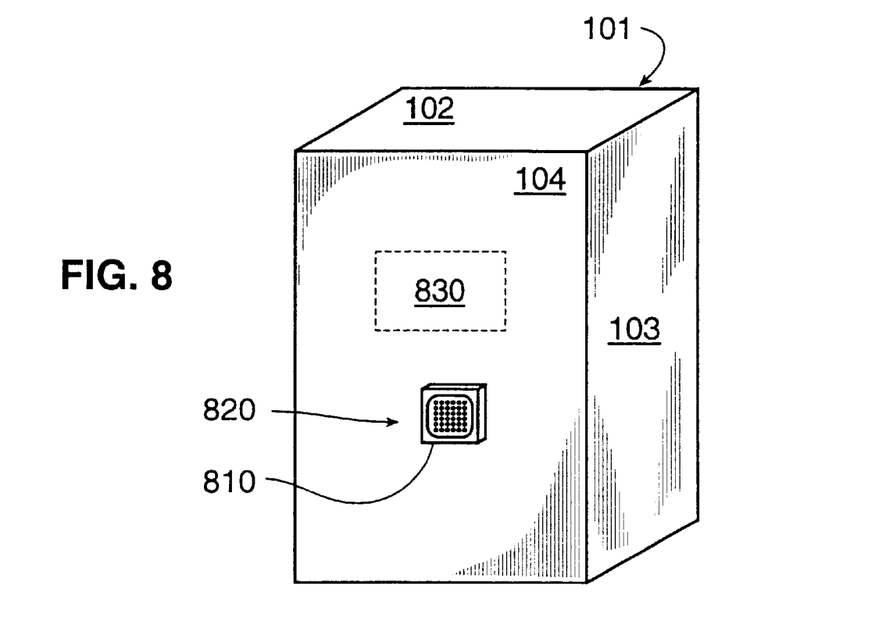
FIG. 8 illustrates a back view of the chip chassis shown in FIG. 1 according to the present invention.

FIG. 8—Back View of Housing

Referring now to FIG. 8, an embodiment of the back side 104 of the housing 100 is shown in a rear perspective view. The top 102, right side 103 and rear 104 are visible as is an external I/O connection 820 at location 810. In one embodiment, location 810 is directly in line with slot 110C as was referenced in the embodiment of FIG. 6 as being the preferred location for an I/O control module 200. Location 830 is operable to receive a heat sink or cooling fin assembly (not shown), similar to location 130 shown in FIG. 1.

Figure 9:
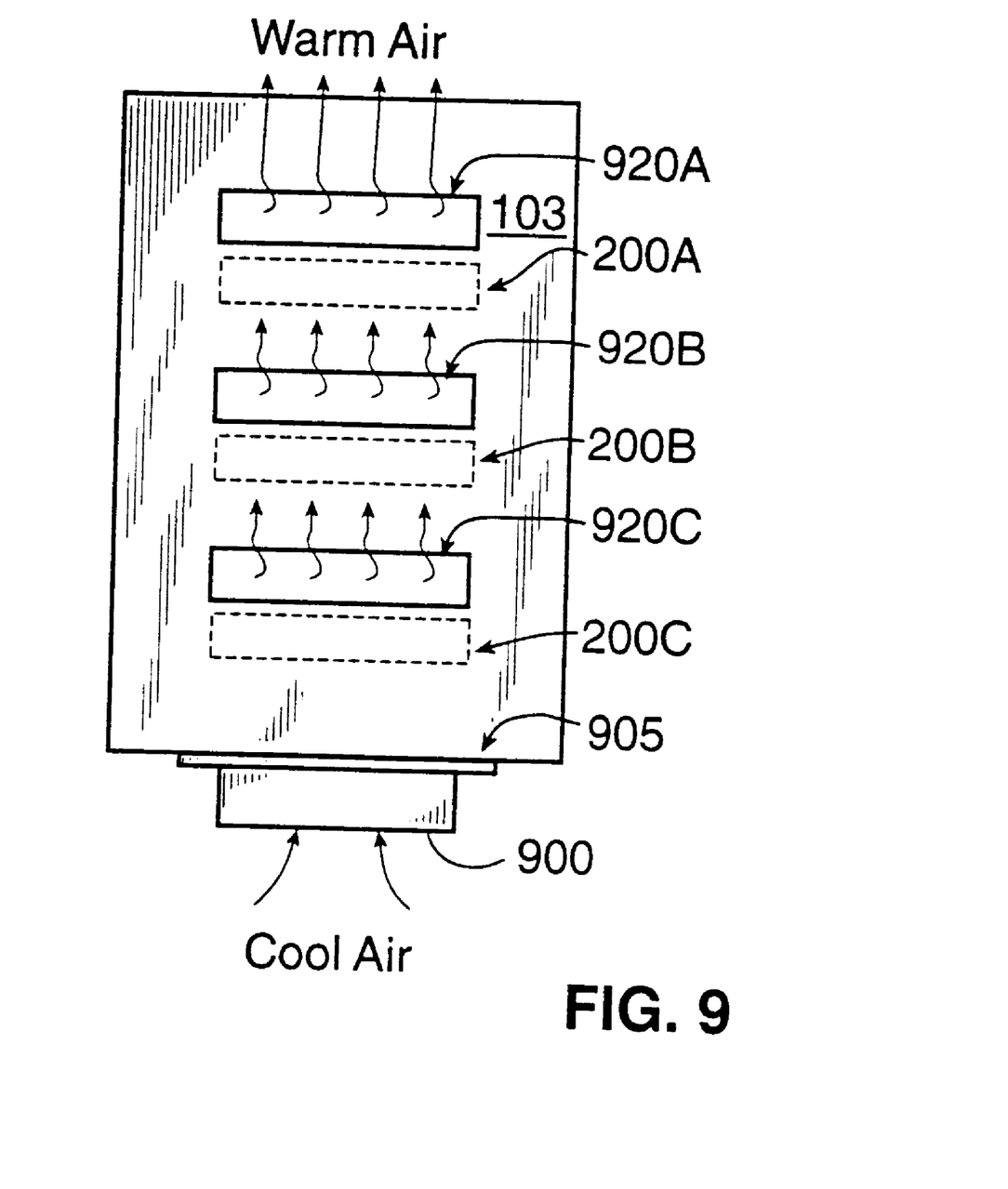
FIG. 9 illustrates a cut-away side view of the chip chassis shown in FIG. 1 showing an embodiment of various particulars available for cooling the chip chassis according to the present invention.

FIG. 9—Rear View of Housing

Referring now to FIG. 9, an embodiment of a cut-away right side 103 view of the housing 100 is shown with reference to various cooling modalities contemplated for the chip chassis 100. The locations of modules 200A–200C are shown for illustrative purposes to provide a relative location for the vent locations 920A–920C. A cooling fan 900 preferably mounts at location 905 on the bottom of the housing 100 to force cool air through the housing 100, exiting as warm air through vents 920A–920C above the locations of the modules 200A–200C. The arrows show the direction of motion of the air which is warmed by the components of the housing 100. Vent pathways in the housing allow the air or other coolant to circulate through the chip chassis 100 and remove heat through convection. The locations of the vents and pathways is designed to take advantage of natural convection should the cooling fan 900 or cooling pump (not shown) fail. In another embodiment, it is contemplated that the chip chassis 100 is wholly encased in another container (not shown) which has a non-electrically conductive fluid forced through the housing 100 for cooling purposes.

CONCLUSION

Therefore, the present invention comprises an improved system for connecting modules on an integrated circuit in an on-chip network. Although the system of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A chip chassis for housing a plurality of semiconductor devices having electrical contacts, the chip chassis comprising:

a housing, wherein the housing includes a plurality of slots, wherein each of the plurality of slots is configured to receive a particular type of semiconductor device;

wherein the housing further comprises a plurality of connectors comprised in each of the slots, wherein each of the plurality of connectors within a respective slot of the housing is configured to physically and electrically contact corresponding electrical contacts of the package of the particular type of semiconductor device when the particular type of semiconductor device is inserted within the respective slot;

wherein the housing includes signal traces defining an electrical backplane;

wherein each of the plurality of connectors comprised in each of the slots includes an internal bus connector, wherein said internal bus connectors are electrically coupled through the electrical backplane to provide command pathways and data pathways among only the semiconductor devices placed within the housing;

wherein each of the plurality of connectors comprised in each of the slots is electrically coupled through the electrical backplane within the housing for electrical communications between each of the slots.

2. The chip chassis of claim 1, wherein each of the plurality of slots is configured to receive a particular type of semiconductor device, wherein the plurality of connectors comprised in said each of the plurality of slots are configured for physically and electrically contacting corresponding electrical contacts on the package of the particular type of semiconductor device designed for the corresponding slot when the particular type of semiconductor device is inserted within the corresponding slot of the housing.

3. The chip chassis of claim 2, wherein at least one of the plurality of slots is further configured to receive only a processing unit, wherein the plurality of connectors comprised in said at least one of the plurality of slots are configured for physically and electrically contacting corresponding electrical contacts on the package of the processing unit.

4. The chip chassis of claim 3, wherein the processing unit is one of a group, said group consisting of a primary CPU module, a secondary CPU module, a FPU module, a DSP module, a video processing module and a task-specific module.

5. The chip chassis of claim 2, wherein at least one of the plurality of slots is further configured to receive only a memory module, wherein the plurality of connectors comprised in said at least one of the plurality of slots are configured for physically and electrically contacting corresponding electrical contacts on the package of the memory module.

6. The chip chassis of claim 5, wherein the memory module is one of a group, said group consisting of a RAM module, a ROM module, and a flash memory module.

7. The chip chassis of claim 2, wherein at least one of the plurality of slots is further configured to receive only an I/O control module, wherein the plurality of connectors comprised in said at least one of the plurality of slots are configured for physically and electrically contacting corresponding electrical contacts on the package of the I/O control module.

8. The chip chassis of claim 7, wherein the housing further includes an I/O slot configured to provide access for the semiconductor devices to external data storage devices for the storage and retrieval of data.

9. The chip chassis of claim 7, wherein the housing further includes an I/O slot configured to provide access to external communications devices for exchanging data.

10. The chip chassis of claim 7, wherein the housing includes an I/O slot configured to provide access to user interface devices to allow for the input of data.

11. The chip chassis of claim 7, wherein the I/O control module is configured to arbitrate for the remaining semiconductor devices for priority use of the electrical backplane.

12. The chip chassis of claim 2, wherein at least one of the plurality of slots is further configured to receive only a system module, wherein the system module includes two or more of the group consisting of a processor, a memory and an I/O controller, wherein the plurality of connectors comprised in said at least one of the plurality of slots are configured for physically and electrically contacting corresponding electrical contacts on the package of the system module.

13. The chip chassis of claim 2, wherein the plurality of slots includes a first slot configured to receive only a processing unit, a second slot configured to receive only a memory module, and a third slot configured to receive only an I/O control module.

14. The chip chassis of claim 2, wherein at least two of the plurality of slots have differing physical dimensions, wherein the particular type of semiconductor device that each of the at least two of the plurality of slots is configured to receive also has differing physical dimensions.

15. The chip chassis of claim 1,
wherein at least one of the connectors comprised in at least one of the slots is electrically coupled to provide command pathways and data pathways only between the semiconductor devices placed within the housing and a device external to the housing.

16. The chip chassis of claim 1,
wherein the plurality of connectors is divided into a plurality of groups of connectors, wherein a first group of the plurality of groups of connectors is positioned on an inside of a back wall of the housing, and wherein at least a second group of the plurality of groups of connectors is positioned on an inside of a side wall of the housing; and
wherein the electrical backplane within the housing is divided into a first backplane including at least a portion of the first group of the plurality of groups of connectors, and at least one sideplane including at least a portion of the second group of the plurality of groups of connectors.

17. The chip chassis of claim 16, further comprising:
one or more semiconductor devices enclosed in a respective package, wherein each respective package is configured to be housed in one or more of the slots of the housing, wherein said each respective package includes a plurality of the electrical contacts which are configured to physically and electrically contact the electrical connectors comprised in the respective slot when each of the semiconductor devices is inserted into the respective slot.

18. The chip chassis of claim 17,
wherein each slot in the housing includes one or more railings configured to receive the package of the semiconductor device when the semiconductor device is inserted in to the slot, wherein the second group of the plurality of groups of connectors is located on the one or more railings; and
wherein each respective package includes a plurality of tabs, wherein each tab includes a plurality of the electrical contacts.

19. The chip chassis of claim 18,
wherein the plurality of tabs includes a left tab, a right tab, and a rear tab, wherein the rear tab includes a first plurality of electrical contacts configured to physically and electrically contact the electrical connectors located on the inside of the rear wall of the housing, and wherein the left and right tabs include a second plurality of electrical contacts configured to physically and electrically contact the electrical connectors located on the one or more railings, wherein the first plurality of electrical contacts on the rear tab are configured to electrically couple to the first backplane, and wherein the second plurality of electrical contacts on the left tab and the right tab are configured to electrically couple to the at least one sideplane.

20. The chip chassis of claim 1, wherein each of the plurality of slots is isolated from an adjacent slot by a wall of the chip chassis.

21. The chip chassis of claim 20, wherein, for each of the slots, the housing includes left and right side walls, top and bottom walls and a rear wall defining the slot.

22. A chip chassis for housing a plurality of semiconductor devices, the chip chassis comprising:

a housing, wherein the housing includes a plurality of slots, wherein each of the plurality of slots is configured to receive a particular type of semiconductor device, wherein the housing further includes a plurality of connectors comprised in each of the slots, wherein each of the plurality of connectors is configured to physically and electrically contact corresponding electrical contacts of the particular type of semiconductor device when the particular type of semiconductor device is inserted within a respective slot of the housing;

wherein each of the plurality of connectors comprised in each of the slots is electrically coupled to provide an electrical backplane within the housing for electrical communications between each of the slots and between each of the slots and the outside wall; and one or more of the particular type of semiconductor device configured to be housed in one or more slots of the housing, wherein each of the one or more particular type of semiconductor device includes electrical contacts configured to physically and electrically contact the electrical connectors comprised in the respective slot when the particular type of semiconductor device is inserted in the respective slot; and wherein each of the plurality of slots is configured to receive a particular type of semiconductor device, wherein the plurality of connectors comprised in said each of the plurality of slots are configured for physically and electrically contacting corresponding electrical contacts on the package of the particular type of semiconductor device designed for the corresponding slot when the particular type of semiconductor device is inserted within the corresponding slot of the housing wherein at least two of the plurality of slots have differing physical dimensions, wherein the particular type of semiconductor device that each of the at least two of the plurality of slots is configured to receive also has differing physical dimensions.

23. The chip chassis of claim 22, wherein at least one of the plurality of slots is further configured to receive only a processing unit, wherein the plurality of connectors comprised in said at least one of the plurality of slots are configured for physically and electrically contacting corresponding electrical contacts on the package of the processing unit.

24. The chip chassis of claim 22, wherein at least one of the plurality of slots is further configured to receive a memory module, wherein the plurality of connectors comprised in said at least one of the plurality of slots are configured for physically and electrically contacting corresponding electrical contacts on the package of the memory module.

25. The chip chassis of claim 22, wherein at least one of the plurality of slots is further configured to receive only a system module, wherein the system module includes two or more of the group consisting of a processor, a memory and an I/O controller, wherein the plurality of connectors comprised in said at least one of the plurality of slots are configured for physically and electrically contacting corresponding electrical contacts on the package of the system module.

26. The chip chassis of claim 22, wherein the plurality of slots includes a first slot configured to receive only a processing unit, a second slot configured to receive only a memory module, and a third slot configured to receive only an I/O control module.

27. The chip chassis of claim 22, wherein each of the plurality of slots is isolated from an adjacent slot by a wall of the chip chassis.

28. The chip chassis of claim 27, wherein, for each of the slots, the housing includes left and right side walls, top and bottom walls and a rear wall defining the slot.

29. A chip chassis for housing a plurality of semiconductor devices having electrical contacts, the chip chassis comprising:

a housing, wherein the housing includes a plurality of slots, wherein each of the plurality of slots is configured to receiving a semiconductor device, wherein the housing further includes a plurality of connectors comprised in each of the slots, wherein each plurality of connectors within a respective slot of the housing is configured to physically and electrically contact corresponding electrical contacts of the semiconductor device when the semiconductor device is inserted within the respective slot;

wherein each of the plurality of connectors comprised in each of the slots is electrically coupled to provide an electrical backplane within the housing for electrical communications between each of the slots; and wherein each of the plurality of slots is configured to receive only a particular type of semiconductor device, wherein the plurality of connectors comprised in said each of the plurality of slots are configured for physically and electrically contacting corresponding electrical contacts on the particular type of semiconductor device designed for the corresponding slot when the particular type of semiconductor device is inserted within the corresponding slot of the housing.

30. The chip chassis of claim 29, wherein at least one of the plurality of slots is further configured to receive only a processing unit, wherein the plurality of connectors comprised in said at least one of the plurality of slots are configured for physically and electrically contacting corresponding electrical contacts on the package of the processing unit.

31. The chip chassis of claim 29, wherein at least one of the plurality of slots is further configured to receive only a memory module, wherein the plurality of connectors comprised in said at least one of the plurality of slots are configured for physically and electrically contacting corresponding electrical contacts on the package of the memory module.

32. The chip chassis of claim 29, wherein at least one of the plurality of slots is further configured to receive only a system module, wherein the system module includes two or more of the group consisting of a processor, a memory and an I/O controller, wherein the plurality of connectors comprised in said at least one of the plurality of slots are configured for physically and electrically contacting corresponding electrical contacts on the package of module.

33. The chip chassis of claim 29, wherein the plurality of slots includes a first slot configured to receive only a processing unit, a second slot configured to receive only a memory module, and a third slot configured to receive only an I/O control module.

34. The chip chassis of claim 29, wherein at least two of the plurality of slots have differing physical dimensions, wherein the particular type of semiconductor device that each of the at least two of the plurality of slots is configured to receive also has differing physical dimensions.

35. The chip chassis of claim 29, wherein each of the plurality of slots is isolated from an adjacent slot by a wall of the chip chassis.

36. The chip chassis of claim 35, wherein, for each of the slots, the housing includes left and right side walls, top and bottom walls and a rear wall defining the slot.

* * * * *